United States Patent
Sethi et al.

(10) Patent No.: US 11,431,580 B2
(45) Date of Patent: Aug. 30, 2022

(54) AUTOMATED GENERATION OF A VISUALIZATION OF A SYSTEM TOPOLOGY

(71) Applicant: Dell Products L.P., Round Rock, TX (US)

(72) Inventors: Parminder Singh Sethi, Ludhiana (IN); Karan Arora, Bangalore (IN); Vaideeswaran Ganesan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/927,403

(22) Filed: Jul. 13, 2020

(65) Prior Publication Data

US 2022/0014441 A1 Jan. 13, 2022

(51) Int. Cl.
| | | |
|---|---|---|
| H04L 12/24 | (2006.01) | |
| H04L 29/12 | (2006.01) | |
| H04L 41/14 | (2022.01) | |
| H04L 61/103 | (2022.01) | |
| H04L 101/622 | (2022.01) | |
| H04L 41/12 | (2022.01) | |

(52) U.S. Cl.
CPC ............ *H04L 41/145* (2013.01); *H04L 41/12* (2013.01); *H04L 61/103* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 2006/0146857 A1* | 7/2006 | Naik | ............... | H04L 47/20 370/432 |
| 2011/0277034 A1* | 11/2011 | Hanson | ............... | H04L 63/1433 726/25 |
| 2020/0169476 A1* | 5/2020 | Vela | ............... | H04L 43/045 |
| 2021/0021492 A1* | 1/2021 | Gao | ............... | H04L 41/14 |

OTHER PUBLICATIONS

Wikipedia, "Autonegotiation," https://en.wikipedia.org/w/index.php?title=Autonegotiation&oldid=954881081, May 4, 2020, 7 pages.

(Continued)

*Primary Examiner* — Kevin T Bates
*Assistant Examiner* — Emad Siddiqi
(74) *Attorney, Agent, or Firm* — Ryan, Mason & Lewis, LLP

(57) ABSTRACT

A method comprises collecting device data and connection data corresponding to a plurality of connected devices in a system, and identifying a plurality of network connections between two or more of the plurality of connected devices from the device data and the connection data. In the method, one or more configuration issues across one or more of the plurality of network connections are detected, and a visualization of a topology of the plurality of connected devices in the system is generated. The visualization comprises a depiction of the plurality of connected devices, the plurality of network connections and the one or more configuration issues.

20 Claims, 7 Drawing Sheets

(56) References Cited

OTHER PUBLICATIONS

DNS Stuff, "What Is Network Topology? Best Guide to Types and Diagrams," https://www.dnsstuff.com/what-is-network-topology, Aug. 15, 2019, 19 pages.
Wikipedia, "Network Topology," https://en.Wikipedia.org/w/index.php?title=Network_topology&oldid=963530767, Jun. 20, 2020, 14 pages.
Dell Technologies, "OpenManage Systems Management Solution Portfolio," 2020, 8 pages.
Wikipedia, "PHY," https://en.wikipedia.org/w/index.php?title=PHY&oldid=958750775, May 25, 2020, 2 pages.
Wikipedia, "Spanning Tree Protocol," https://en.wikipedia.org/w/index.php?title=Spanning_Tree_Protocol&oldid=960389030, Jun. 2, 2020, 14 pages.
CISCO, "Understanding and Configuring Spanning Tree Protocol (STP) on Catalyst Switches," https://www.cisco.com/c/en/us/support/docs/lan-switching/spanning-tree-protocol/5234-5.html, Dec. 11, 2019, 10 pages.
Dell EMC, "SupportAssist for Enterprise Systems," Jun. 2018, 2 pages.
Wikipedia, "Data Center Bridging," https://en.wikipedia.org/w/index.php?title=Data_center_bridging&oldid=891687264, Apr. 9, 2019, 4 pages.
MICROSEMI "How do SAS Devices Communicate?" https://storage.microsemi.com/en-us/support/infocenter/release-2016-1/index.jsp?topic=/RAID_IUG.xml/Topics/Whats_a_Phy.html, Accessed Jul. 1, 2020, 2 pages.
Dell EMC, "The Integrated Dell Remote Access Controller 9 (iDRAC9) Solution Brief," 2019, 2 pages.
Wikipedia, "MAC Address," https://en.wikipedia.org/w/index.php?title=MAC_address&oldid=963745543, Jun. 21, 2020, 9 pages.
Wikipedia, "Network Interface Controller," https://en.wikipedia.org/w/index.php?title=Network_interface_controller&oldid=963337977, Jun. 19, 2020, 5 pages.
C. Taylor, "What Is iSCSI and How Does It Work?" Enterprise Storage Forum, https://www.enterprisestorageforum.com/storage-hardware/iscsi.html, May 23, 2019, 5 pages.

* cited by examiner

AUTOMATED GENERATION OF A VISUALIZATION OF A SYSTEM TOPOLOGY

FIELD

The field relates generally to information processing systems, and more particularly to generation of network topological views of information processing systems.

BACKGROUND

Data centers are one example of an information processing system. Data centers typically comprise large numbers of servers and other physical devices that are interconnected via a communication network. There exist tools for generating network topology in a two-dimensional (2D) format that show generic connectivity without specific details. Data center administrators typically end up executing multiple commands or reviewing lengthy reports to determine detailed connectivity scenarios in the data center. Such existing network topology tools result in administrative tasks that could be very time consuming and require strong technical expertise.

SUMMARY

Illustrative embodiments provide techniques for improved generation of network topological views of information processing systems.

In one embodiment, a method comprises collecting device data and connection data corresponding to a plurality of connected devices in a system, and identifying a plurality of network connections between two or more of the plurality of connected devices from the device data and the connection data. In the method, one or more configuration issues across one or more of the plurality of network connections are detected, and a visualization of a topology of the plurality of connected devices in the system is generated. The visualization comprises a depiction of the plurality of connected devices, the plurality of network connections and the one or more configuration issues.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
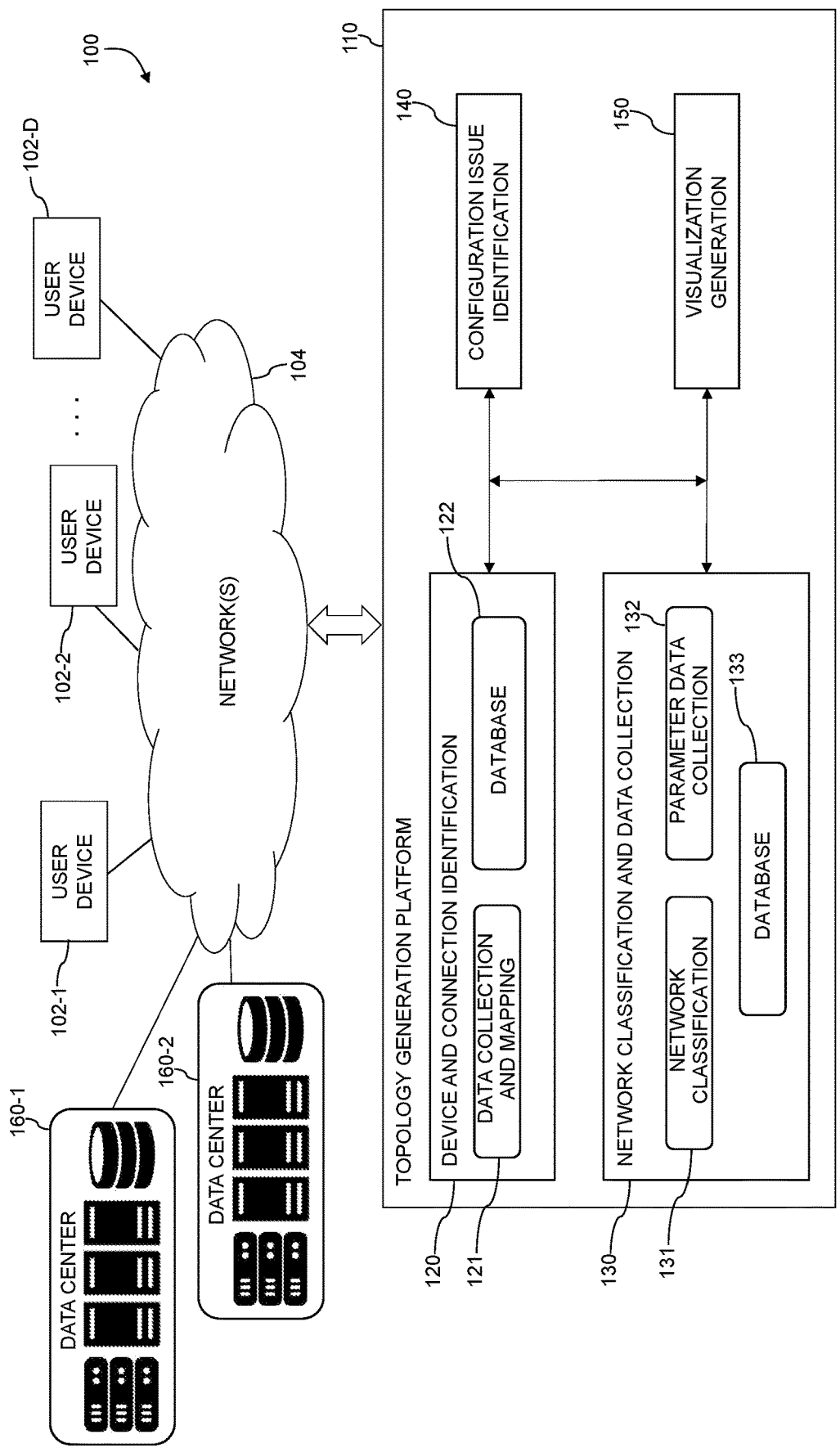
FIG. 1 depicts details of an information processing system with a topology generation platform for automatically generating a network topology according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As mentioned above in the background section, existing 2D network topology tools offer results that still require system administrators to perform additional significant work in order to troubleshoot a problem.

Illustrative embodiments provide solutions that address this and other drawbacks of existing network topology tools by visually representing network device details in an optimal manner that leads to more efficient troubleshooting. More particularly, it is realized herein that information from network devices can be used to build an improved topology view. For example, topology information can be retrieved from console management tools, and used to generate improved topology views. Existing network topology tools do not provide details of physical port-to-physical port (phy-port-to-phy-port) connectivity. Illustrative embodiments provide functionalities for obtaining precise phy-portto-phy-port connectivity information, identifying configuration issues, and utilizing such information to generate an improved network topology presentation (view).

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a topology generation platform 110.

The user devices 102 can comprise, for example, Internet of Things (IoT) devices, desktop, laptop or tablet computers, mobile telephones, or other types of processing devices capable of communicating with the topology generation platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L and P are assumed to be arbitrary positive integers greater than or equal to two.

The terms "client" or "user" herein are intended to be broadly construed so as to encompass numerous arrangements of human, hardware, software or firmware entities, as well as combinations of such entities. At least a portion of the available services and functionalities provided by the topology generation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the topology generation platform 110, as well as to support communication between the topology generation platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the topology generation platform 110.

The information processing system 100 further includes data center 160-1 and data center 160-2 (collectively "data centers 160") connected to the user devices 102 and to the topology generation platform 110 via the network 104. The data centers 160 comprise physical devices such as, for example, servers, switches, storage arrays, chassis, blades, etc., which are connected over one or more networks like network 104 and/or through direct wired connections. The topology generation platform 110 generates a visualization of the data centers 160 for users such as, for example, data center administrators, so that the users can efficiently view the components of the data center and pinpoint the sources of any problems in the data center in order to perform troubleshooting. Although data centers 160 are shown in FIG. 1, the embodiments are not necessarily limited thereto. For example, a data center is one example of a computing system for which the topology generation platform 110 is configured to generate a topology visualization. The topology generation platform 110 can generate topological views of any computing system comprising devices connected to each other over one or more networks and/or through direct wired connections. Moreover, although two data centers 160-1 and 160-2 are shown, the embodiments are not necessarily limited thereto, and more or less data centers 160 may be part of the information processing system 100.

As explained in more detail herein, using physical and virtual media access control (MAC) addresses, the topology generation platform 110 generates a 3D view comprising hardware, physical, software and virtualized component details. Different types of networks and their configurations are identified in the topology. For example, the topological view comprises details about trust settings of connected components and network purpose such as, for example, workload and management networks. The topology generation platform 110 automatically identifies configuration issues across connections by detecting network settings on both sides of a connection. In addition, topology generation platform 110 automatically identifies and tracks configuration issues across multiple devices in a computing system by using MAC addresses to generate a connectivity diagram and traversing through the connectivity diagram.

The topology generation platform 110 in the present embodiment is assumed to be accessible to the user devices 102, and vice-versa, over the network 104. In addition, the topology generation platform 110 and the user devices 102 can access the vendor servers data centers 160 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The topology generation platform 110, on behalf of respective infrastructure tenants each corresponding to one or more users associated with respective ones of the user devices 102 provides a platform for automatically generating a detailed topological view of a computing system such as, for example, a data center, that a user can reference when troubleshooting problems in the computing system.

Referring to FIG. 1, the topology generation platform 110 comprises a device and connection identification engine 120, a network classification and data collection engine 130, a configuration issue identification engine 140 and a visualization generation engine 150. The device and connection identification engine 120 includes a data collection and mapping component 121 and a database 122. The network classification and data collection engine 130 includes a network classification component 131, a parameter data collection component 132 and a database 133.

Referring to the system 100 in FIG. 1, the data collection and mapping component 121 of the device and connection identification engine 120 collects data from devices of a data center 160-1 or 160-2 including, for example, device identifiers (IDs), phy-port-to-phy-port connectivity and the details of the configurations for the phy-port-to-phy-port connections. The embodiments are not necessarily limited to connections between physical ports, and collect and compile data for device connections between multiple types of interface points in addition to network ports. For example, data for storage end-points is also collected and compiled. The storage end points (e.g., Internet SCSI (iSCSI) targets) could be hosted on a storage area network (SAN) and/or network-attached storage (NAS) devices. The SAN and/or NAS devices are mounted on servers as boot devices, where operating systems are stored on the iSCSI targets, or as storage devices, where data storage is on the iSCSI Targets. Data for hyper-converged infrastructures (HCIs) like a virtual SAN (vSAN) and for other types of storage spaces is also collected and compiled. The storage volume of an HCI environment can be hosted on disks coming from various servers, wherein the storage end-points may have issues such as, for example: (i) disk failures, which can occur frequently and cause performance issues, such as when a vSAN tries to recover from disk failures; and (ii) disk performance issues, which are caused due to high a number of problematic blocks.

According to an embodiment, the data collection and mapping component 121 collects from the devices of the data centers 160 details identifying all transmission control protocol (TCP) and/or user datagram protocol (UDP) ports for the devices. The collection is performed using, for example, a command such as "netstat-a," which requests all active connections and the TCP and UDP ports on a computer. The data collection and mapping component 121 maps the network ports (e.g., TCP and UDP ports) to a network layer address (e.g., Internet Protocol (IP) address). The IP addresses are obtained using, for example, a command such as "gethostentbyname," which retrieves the IP address corresponding to a given Internet host name. The data collection and mapping component 121 maps the network layer addresses to a plurality of MAC addresses. The mapping can be performed using, for example, a command such as "ipconfig/all," in order to identify IP configuration details of devices in the data centers 160 or other type of system. The IP configuration details include, for example, hardware MAC addresses, and IP addresses associated with the MAC addresses. The data collection and mapping component 121 identifies networking adapters associated with devices of a computing system, with their MAC addresses, IP addresses, default gateways and subnet masks.

According to an embodiment, the data collection and mapping component 121 maps virtual MAC addresses to physical MAC addresses by collecting all the physical MAC and virtual MAC addresses across all operating systems (e.g., ESXi, Linux, Windows) as well as mappings from hardware (e.g., Integrated Dell® Remote Access Controller (iDRAC), chassis, etc.) using one or more collection protocols. The collected data and mappings are stored in a database 122.

According to an embodiment, the network classification and data collection engine 130, and more particularly, the network classification component 131 classifies networks connecting devices within a computing system based on the type of network. For example, a management type network is a network having an infrastructure designed for management tasks, such as, for example management of software, hardware, devices, files, security, users, access and maintenance. A workload type network is a network having an infrastructure designed for workload tasks, such as, for example, accurate and efficient delivery of services to users. Construction of management-based and workload-based networks may require coordination of infrastructure elements like switches, firewalls, load balancers and optimizers to achieve the goals of the networks. According to an embodiment, if a physical port is designated as management or workload port, then it is marked as such on the generated visualization of the topology.

The network classification component 131 also identifies whether networks connecting devices within a computing system have any trust issues. For example, connected devices may have different trust settings from each other, where a first connected device has a two-way trust setting and a second connected device has a one-way trust setting. In more detail, one-way trust creates a unidirectional authentication path between two domains (e.g., a trusted domain and a trusting domain). For example, users or computers in the trusted domain are able to access resources and/or data in the trusting domain, but users or computers in the trusting domain cannot access resources and/or data in the trusted domain. With two-way trust, the trusting and trusted domains both trust each other such that trust and access flow in both directions, and authentication requests can be passed between the two domains in both directions. The network classification component 131 identifies when trust settings between two connected devices and/or network interface points (e.g., network ports) are different from and conflict with each other.

The parameter data collection component 132 of the network classification and data collection engine 130 collects network parameters of connections between different devices. For example, the parameter data collection component 132 collects all configuration parameters such as, but not necessarily limited to, data center bridging (DCB) settings, network baud rate settings, negotiation settings (e.g., whether auto-negotiation is on or off), WiLAN™ port IDs and/or protocol settings (e.g., whether certain protocols are in place, like spanning tree protocol (STP)) for each MAC addresses at a device layer.

Figure 2:
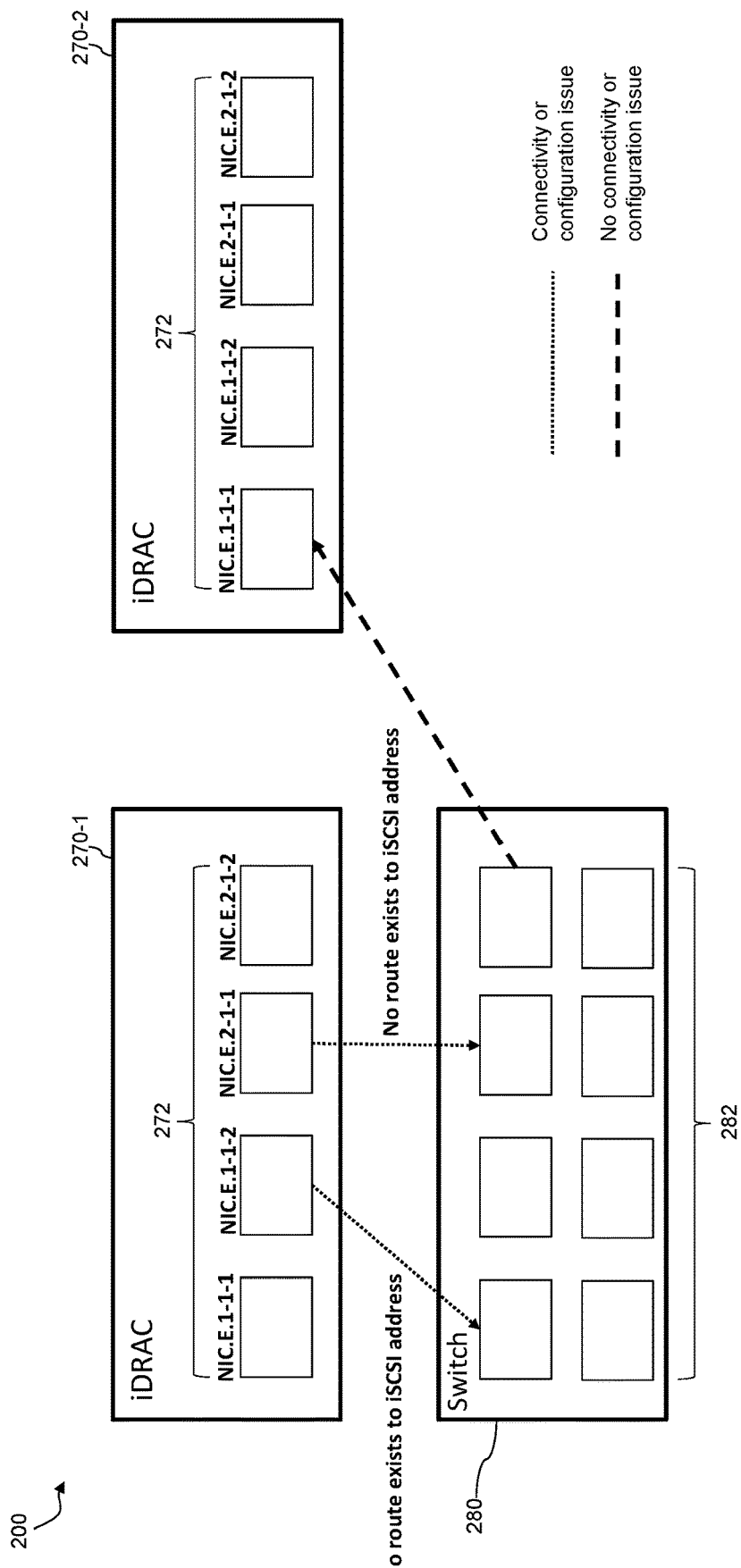
FIG. 2 depicts details of connectivity and configuration issues between elements of a system for which a network topology is generated according to an illustrative embodiment.
Figure 3:
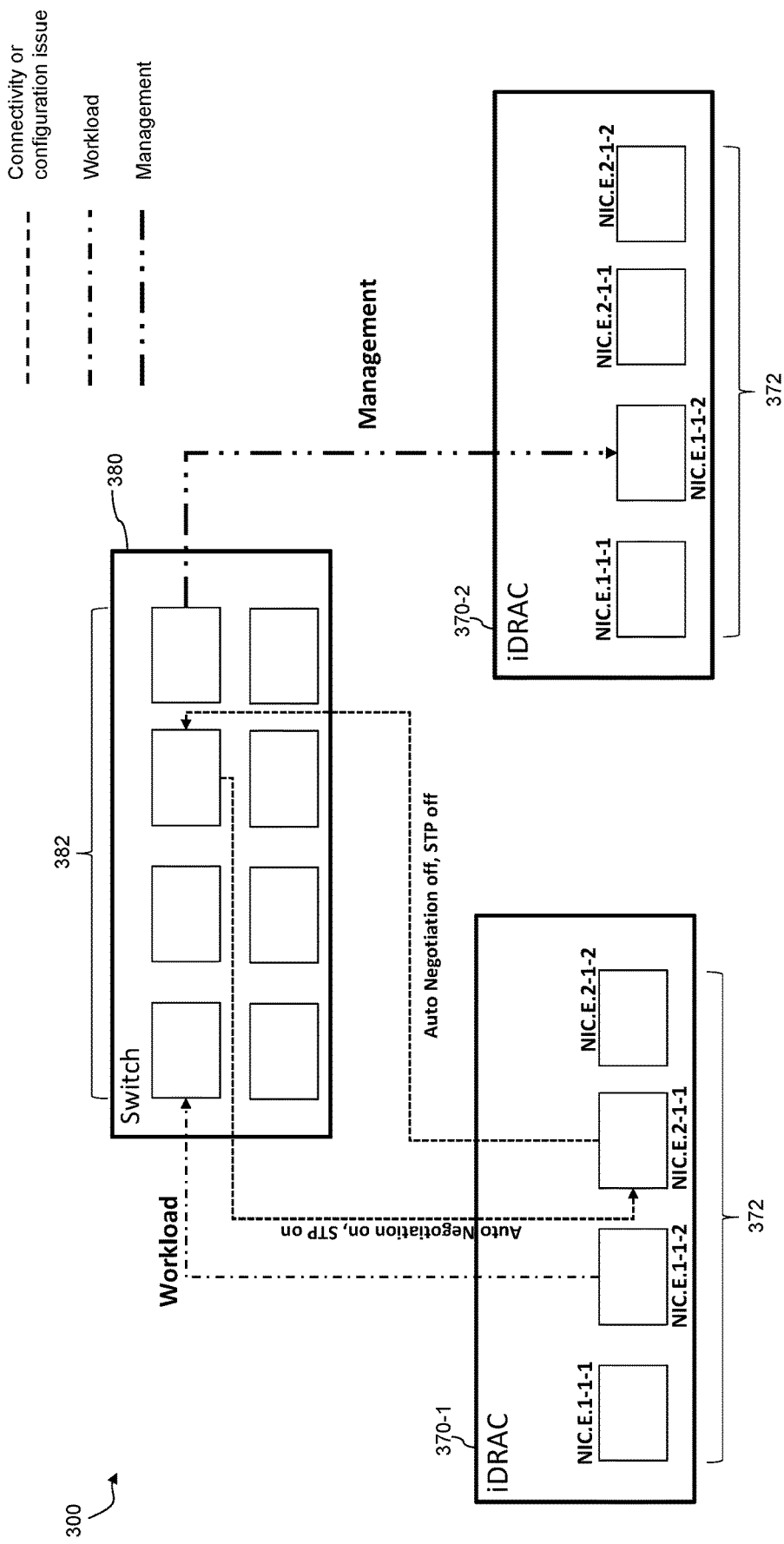
FIG. 3 depicts workload and management connections, as well as configuration issues between elements of a system for which a network topology is generated according to an illustrative embodiment.

Referring, for example to FIGS. 2 and 3, the configuration issue identification engine 140 identifies connectivity and/or configuration issues of network connections in a system. For example, FIG. 2 depicts a portion of a data center 200 where there are connectivity and/or configuration issues between at least two network interface ports 272 of a first iDRAC 270-1 and two network interface ports 282 of a switch device 280. The switch device 280 comprises, for example, one or more switch fabrics. Host devices communicate over a network via the one or more switch fabrics with storage arrays. The network may comprise at least one SAN and the one or more switch fabrics interconnect the host devices with the storage arrays over the one or more SANs. Communications between host devices and storage arrays within a system may utilize PCIe connections or other types of connections implemented over one or more networks. For example, illustrative embodiments can use interfaces such as iSCSI, Serial Attached SCSI (SAS) and Serial ATA (SATA). Numerous other interfaces and associated communication protocols can be used in other embodiments.

As can be seen in FIG. 2, in a non-limiting example of a connectivity issue, no route exists to an iSCSI address from two ports 272 of an iDRAC 270-1 identified as NIC.E.1-1-2 and NIC.E.2-1-1 ("NIC" refers to "network interface controller"), to two ports 282 of a switching device 280. As a result of this, according to an embodiment, there is no route from the iDRAC 270-1 to a storage array through the switching device 280. In such a scenario a host device (e.g., server) connected to the iDRAC 270-1 would not be able to communicate with the storage array. This can prove problematic in various scenarios where host devices need to communicate with storage arrays to read and/or write data. In addition, in a boot from SAN scenario, servers utilize an operating system installed on external SAN-based storage to boot up rather than booting off the local internal disk of the server or direct attached storage. In the event of an inability to communicate with a storage array, host devices configured for boot from SAN functionality would not be able to boot up. FIG. 2 further illustrates a connection without configuration issues from a port of the switching device 280 to a port 272 (NIC.E.1-1-1) of a second iDRAC 270-2.

An example of a configuration issue between network interface ports is when an open shortest path first (OSPF) property is on for a given network connection, which can cause issues during phy-port disconnects. OSPF is a routing protocol for IP networks that calculates the shortest route to a destination through a network based on an algorithm (e.g., link state routing (LSR) algorithm).

Similar to FIG. 2, FIG. 3 depicts a portion of a data center 300 where there are connectivity and/or configuration issues between network interface points of devices in a system. For example, from at least one port 382 of a switching device 380 to at least one port 372 (NIC.E.2-1-1) of a first iDRAC 370-1 auto-negotiation and STP are both on. However, in the opposite direction from the same port (NIC.E.2-1-1) of the first iDRAC 370-1 to the same port 382 of the switching device 380, auto-negotiation and STP are both off. As noted above, STP refers to spanning tree protocol, such that in one direction STP is in place, and in the opposite direction STP is not in place. Auto-negotiation refers to a signaling mechanism where two connected devices choose common transmission parameters, such as, for example, speed, duplex mode, and flow control. For example, the connected devices may share their capabilities regarding the transmission parameters and then select the highest performance transmission parameters the connected devices can both support. The difference in auto-negotiation and protocol settings in opposite directions is a configuration issue that can prevent transmission of data between the ports in either direction.

FIG. 3 further identifies whether network connections correspond to workload or management networks. For example, the connection from a port 372 (NIC.E.1-1-2) of the first iDRAC 370-1 to a port 382 of the switching device 380 corresponds to a connection over a workload network. The connection from another port 382 of the switching device 380 to a port 372 (NIC.E.1-1-2) of the second iDRAC 370-2 corresponds to a connection over a management network. The collected data, classifications and identified issues are stored in, for example, a database 133.

As explained further herein, configuration and/or connectivity issues and/or differences, as well as differences between network and trust types, are identified in the visualization generated by the visualization generation engine 150. According to one or more embodiments, the identification is in the form of different colored lines and/or different line types (e.g., dashed, dotted, etc.), and/or in the form of textual annotations near lines indicated by the different network connections. In a non-limiting example, management phy-port lines (e.g., iDRAC, chassis management controller (CMC), management phy-ports of switches, etc.) have a first color (e.g., violet), and workload traffic lines have a second color (e.g., brown). If a network is in a trusted domain, another connection line may be colored with a third color (e.g., blue). In addition, different types of trust may be shown as different colored lines; for example, one-way trust may be indicated by a fourth color (e.g., orange), and no-way trust by a fifth color (e.g., red). A green colored line may indicate that there are no connection or configuration issues for a given network connection. It is to be understood that the preceding examples are illustrative, and not meant to limit the embodiments. Different indicators (e.g., different line types, textual annotations, other colors, etc.) may be used in a generated visualization of the embodiments to convey the different types of connections and/or any issues with the different types of connections.

Figure 4:
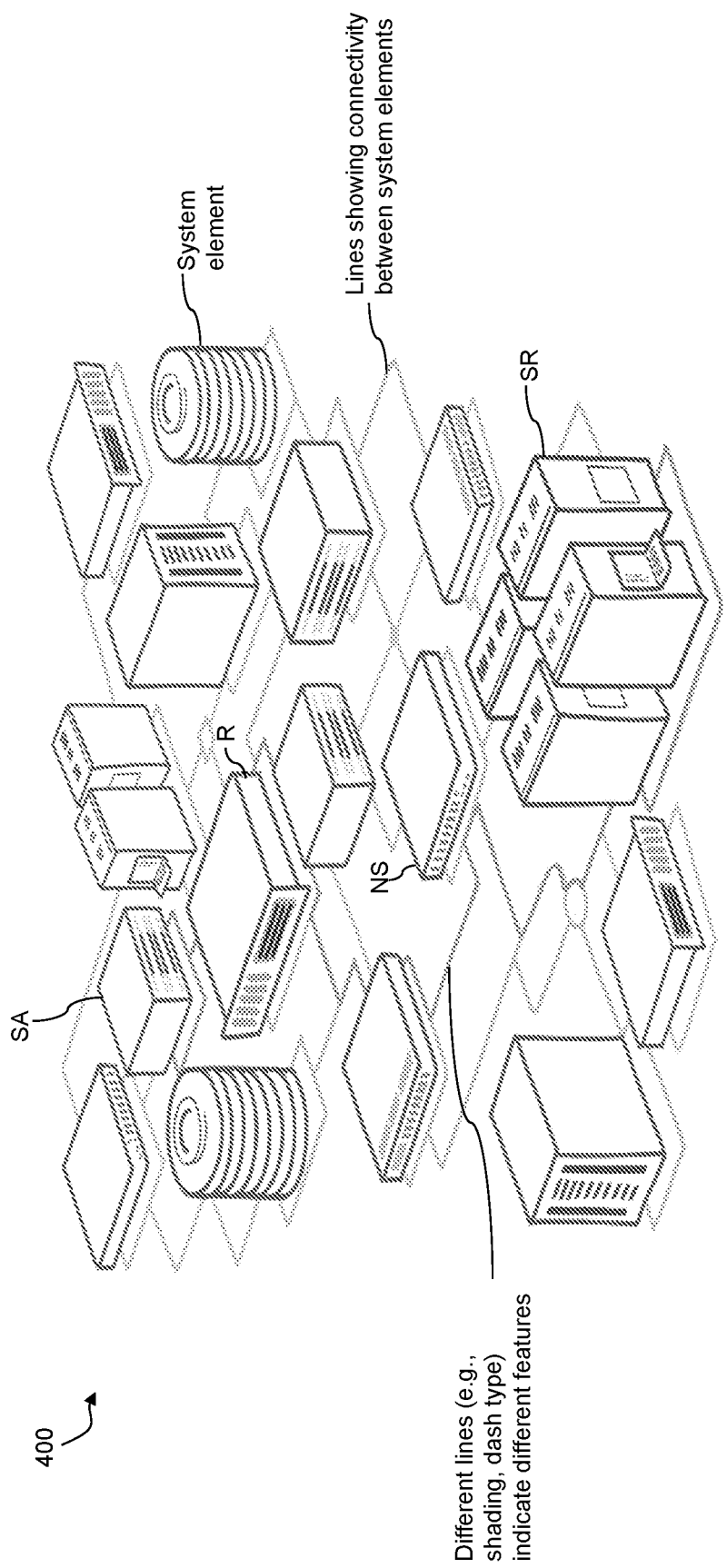
FIG. 4 depicts an example of a three-dimensional (3D) view of a network topology displaying at least a portion of collected and/or analyzed information according to an illustrative embodiment.

Referring back to FIG. 1, the visualization generation engine 150 generates a network topology based on the information gathered and analyzed by the device and connection identification engine 120, the network classification and data collection engine 130 and the configuration issue identification engine 140. An example topological visualization 400 of a system is shown in FIG. 4, which includes, for example, a 3D view of system elements (e.g., servers (SR), network switching devices (NS), routers (R) and storage arrays (SA)), and lines showing connectivity between system elements. As noted herein above, lines may be different from each other to indicate different features, such as, for example, different network types, configuration or connectivity issues, different settings, trust differences, etc. According to an embodiment, referring to FIGS. 2 and 3, a topological visualization generated by the visualization generation engine 150 can identify and depict specific phy-port to phy-port connections between devices, the number of ports (or other network interface points) in each device, network types, configurations and/or connectivity issues between devices and network connections without any issues between devices.

According to an embodiment, in order to generate a topology of a system (e.g., data center), the device and connection identification engine 120 collects MAC addresses all the devices in the system using, for example, Link Layer Discovery Protocol (LLDP), or other protocol for network devices to advertise their identity, capabilities, and neighbors on a network. The network classification and data collection engine 130 collects configuration settings from the system devices corresponding to the MAC Addresses. On the generated topological view, the settings are marked on a link that connects two devices as two directed edges.

The visualization generation engine 150 creates a directed graph with the MAC addresses as the nodes. Nodes of the MAC addresses that correspond to the same teamed NIC of a device are grouped together by the visualization generation engine 150 as a "team node". Nodes of the MAC addresses and the team nodes that correspond to the same device are grouped together by the visualization generation engine 150 as a "device node". Nodes of device nodes that correspond to the same logical entity, such as, for example, a cluster or software defined cluster, are grouped together by the visualization generation engine 150 as a "logical entity node" identified by the name of the logical entity. According to an embodiment, location data (e.g., aisle, datacenter, rack, rack location) are also collected and tagged with a device node.

Referring to FIG. 4, the topological visualization 400 comprises pictorial forms of the devices. Although not shown in FIG. 4, the locations of the phy-ports can be identified in a topological visualization, where lines are created between the phy-ports of the different devices based on the phy-port-to-phy-port connectivity details obtained and/or identified by the device and connection identification engine 120, the network classification and data collection engine 130 and the configuration issue identification engine 140.

According to an embodiment, if there are multiple lines between the phy-ports of the different devices to designate different features, each line is different (e.g., different color, type) based on the feature. In addition, configuration information is placed next to lines connecting the corresponding phy-ports. Such configuration information can include, for example, protocols, trust settings, negotiation settings and other settings. The configuration issue identification engine 140 scans connections represented by the connecting lines in the visualization for connection and/or configuration issues. If there are mismatched configurations, the lines are designated according to the mismatched configurations and/or the mismatches are noted in configuration information annotated near connecting lines. Similarly, connection problems may be depicted according to how lines are shown and/or with appropriate annotations near the corresponding connection having a problem. In a large data center or other system, the visualization may include all of the devices in a system. Alternatively, the scope of the visualization may be limited to a particular network or include all network connections corresponding to a device. The scope may also be limited to a subset of the total number of devices in the system.

According to one or more embodiments, the databases 122 and 133 used by the topology generation platform 110 can be configured according to a relational database management system (RDBMS) (e.g., PostgreSQL). Databases 122 and 133 in some embodiments are implemented using one or more storage systems or devices associated with the topology generation platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, NAS, storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the topology generation platform 110, the device and connection identification engine 120, the network classification and data collection engine 130, the configuration issue identification engine 140 and the visualization generation engine 150 in other embodiments can be implemented at least in part externally to the topology generation platform 110, for example, as stand-alone servers, sets of servers or other types of systems coupled to the network 104. For example, the device and connection identification engine 120, the network classification and data collection engine 130, the configuration issue identification engine 140 and the visualization generation engine 150 may be provided as cloud services accessible by the topology generation platform 110.

The device and connection identification engine 120, the network classification and data collection engine 130, the configuration issue identification engine 140 and/or the visualization generation engine 150 in the FIG. 1 embodiment are each assumed to be implemented using at least one processing device. Each such processing device generally comprises at least one processor and an associated memory, and implements one or more functional modules for controlling certain features of the device and connection identification engine 120, the network classification and data collection engine 130, the configuration issue identification engine 140 and/or the visualization generation engine 150.

At least portions of the topology generation platform 110 and the components thereof may be implemented at least in part in the form of software that is stored in memory and executed by a processor. The topology generation platform 110 and the components thereof comprise further hardware and software required for running the topology generation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the device and connection identification engine 120, the network classification and data collection engine 130, the configuration issue identification engine 140, the visualization generation engine 150 and other components of the topology generation platform 110 in the present embodiment are shown as part of the topology generation platform 110, at least a portion of the device and connection identification engine 120, the network classification and data collection engine 130, the configuration issue identification engine 140, the visualization generation engine 150 and other components of the topology generation platform 110 in other embodiments may be implemented on one or more other processing platforms that are accessible to the topology generation platform 110 over one or more networks. Such components can each be implemented at least in part within another system element or at least in part utilizing one or more stand-alone components coupled to the network 104.

It is assumed that the topology generation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the device and connection identification engine 120, the network classification and data collection engine 130, the configuration issue identification engine 140, the visualization generation engine 150 and other components of the topology generation platform 110, and the elements thereof can each be implemented in the form of one or more LXCs running on one or more VMs. Other arrangements of one or more processing devices of a processing platform can be used to implement the device and connection identification engine 120, the network classification and data collection engine 130, the configuration issue identification engine 140 and the visualization generation engine 150, as well as other components of the topology generation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the topology generation platform 110 to reside in different data centers. Numerous other distributed implementations of the topology generation platform 110 are possible.

Accordingly, one or each of the device and connection identification engine 120, the network classification and data collection engine 130, the configuration issue identification engine 140, the visualization generation engine 150 and other components of the topology generation platform 110 can each be implemented in a distributed manner so as to comprise a plurality of distributed components implemented on respective ones of a plurality of compute nodes of the topology generation platform 110.

It is to be appreciated that these and other features of illustrative embodiments are presented by way of example only, and should not be construed as limiting in any way.

Accordingly, different numbers, types and arrangements of system components such as the device and connection identification engine 120, the network classification and data collection engine 130, the configuration issue identification engine 140, the visualization generation engine 150 and other components of the topology generation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the topology generation platform can be offered to cloud infrastructure customers or other users as part of FaaS, CaaS and/or PaaS offerings.

Figure 5:
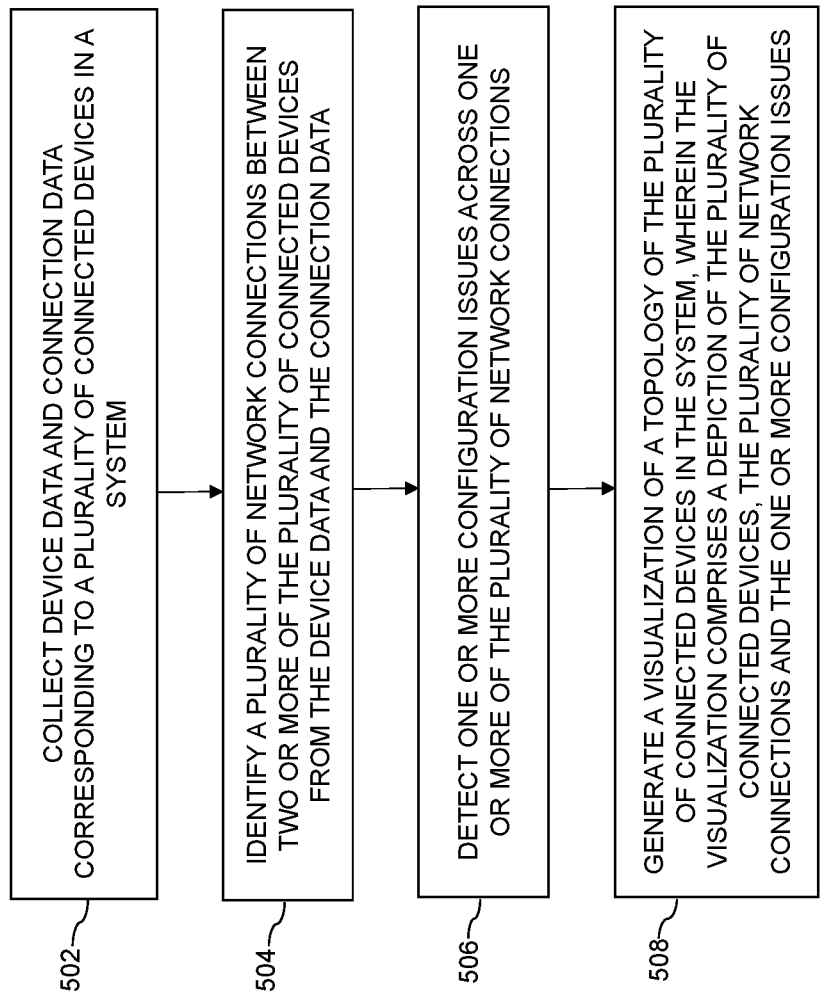
FIG. 5 depicts a process for automatically generating a network topology according to an illustrative embodiment.

The operation of the information processing system 100 will now be described in further detail with reference to the flow diagram of FIG. 5. With reference to FIG. 5, a process 500 for automatically generating a network topology as shown includes steps 502 through 508, and is suitable for use in the system 100 but is more generally applicable to other types of information processing systems comprising a topology generation platform configured for automatically generating a network topology.

In step 502, device data and connection data corresponding to a plurality of connected devices in a system are collected. According to an embodiment, collecting the device data and the connection data comprises retrieving data identifying a plurality of network ports corresponding to the plurality of connected devices, mapping the plurality of network ports to one or more network layer addresses, and mapping the one or more network layer addresses to one or more MAC addresses. One or more virtual MAC addresses may be mapped to one or more physical MAC addresses.

In step 504, a plurality of network connections between two or more of the plurality of connected devices are identified from the device data and the connection data, and in step 506, one or more configuration issues across one or more of the plurality of network connections are detected.

In step 508, a visualization of a topology of the plurality of connected devices in the system is generated. The visualization comprises a depiction of the plurality of connected devices, the plurality of network connections and the one or more configuration issues. According to one or more embodiments, the visualization comprises a 3D view of the system. The visualization depicts a network connection without a configuration issue differently from a network connection with a configuration issue.

The process may also comprise classifying the plurality of network connections as management and/or workload networks, and identifying one or more of the plurality of network connections as having a trust issue.

In accordance with an embodiment, the process comprises identifying parameters of the plurality of network connections. The parameters comprise, for example, a DCB setting, a baud rate setting and a negotiation setting. The process also comprises identifying one or more interface points for each of the plurality of connected devices, wherein the visualization further comprises a depiction of connections between given interface points of the two or more of the plurality of connected devices. The interface points comprise, for example, physical network ports.

Collecting the device data and the connection data may comprise collecting a plurality of MAC addresses corresponding to the plurality of connected devices, and collecting a plurality of parameters from the plurality of connected devices. In an embodiment, generating the visualization comprises associating the plurality of parameters with corresponding ones of the plurality of network connections.

The process may also comprise creating a directed graph comprising the plurality of MAC addresses as a plurality of nodes, grouping nodes of the plurality of nodes that correspond to a same teamed NIC as a team node, grouping nodes of the plurality of nodes and one or more team nodes that correspond to a same device as a device node, and grouping one or more device nodes that correspond to the same logical entity as a logical entity node. In an embodiment, location data is tagged with the device node.

It is to be appreciated that the FIG. 5 process and other features and functionality described above can be adapted for use with other types of information systems configured to execute topology generation services in a topology generation platform or other type of platform.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a topology generation platform as disclosed herein can provide a number of significant advantages relative to conventional arrangements. For example, unlike conventional techniques, the embodiments advantageously generate a 3D topological view of a system that cuts across stack topology (e.g., hardware, physical, software and virtualized components) using physical and virtual MAC addresses. The topological view identifies different types of networks based on trust settings and purpose (e.g., workload and management) by discovering the type of devices on specific networks.

In another advantage, the embodiments automatically identify configuration issues across connections by analyzing network settings on both sides of a network connection. The embodiments further automatically identify and track configuration issues across multiple devices by traversing through an automatically generated connectivity diagram created using MAC addresses.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the topology generation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a topology generation platform in illustrative embodiments. These and other cloud-based systems in illustrative embodiments can include object stores.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
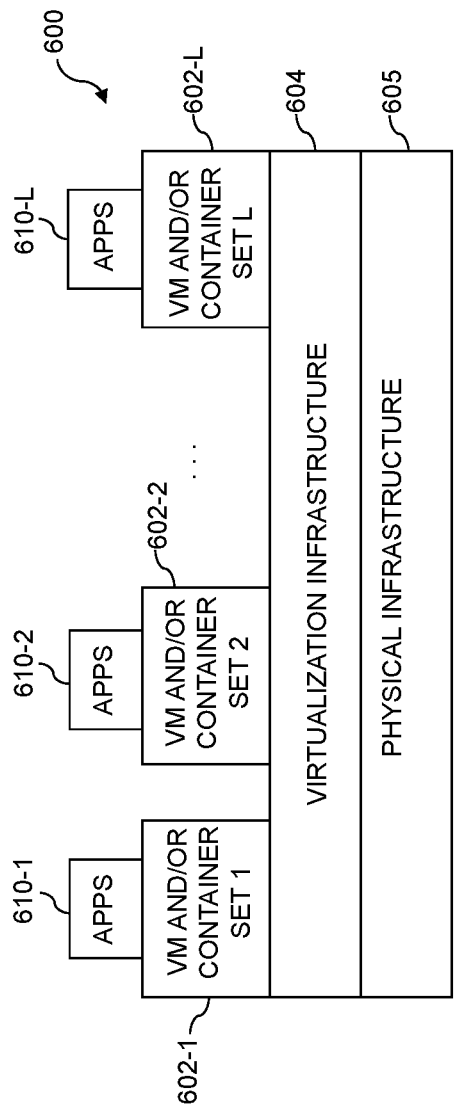
FIGS. 6 and 7 show examples of processing platforms that may be utilized to implement at least a portion of an information processing system according to illustrative embodiments.
Figure 7:
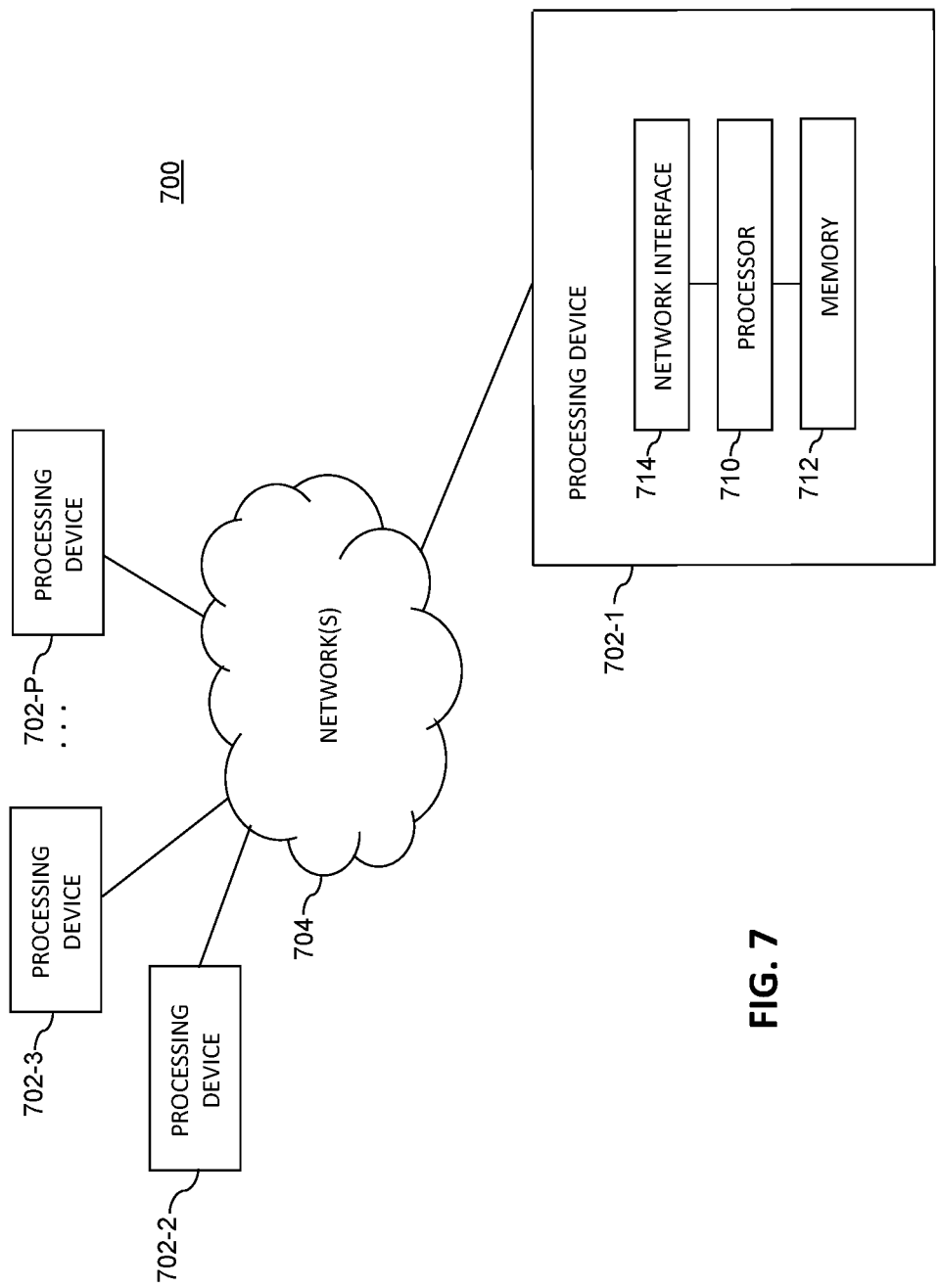

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-P, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the topology generation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and topology generation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   collecting device data and connection data corresponding to a plurality of connected devices in a system;
   wherein collecting the device data and the connection data comprises:
      retrieving data identifying a plurality of network ports corresponding to the plurality of connected devices;
      mapping the plurality of network ports to one or more network layer addresses, the one or more network layer addresses comprising one or more communications protocol addresses; and
      mapping the one or more network layer addresses to a plurality of media access control addresses corresponding to the plurality of connected devices;
   identifying a plurality of network connections between two or more of the plurality of connected devices from the device data and the connection data;
   detecting one or more configuration issues across one or more of the plurality of network connections;
   classifying one or more of the plurality of network connections as one of a management network and a workload network, wherein the management network comprises an infrastructure designed for management tasks, and the workload network comprises an infrastructure designed for workload tasks; and
   generating a visualization of a topology of the plurality of connected devices in the system;
   wherein the one or more configuration issues comprise different transmission settings of at least two connected devices of the plurality of connected devices, the different transmission settings comprising at least one of different trust settings, different negotiation settings and different protocol settings of the at least two connected devices;
   wherein the visualization comprises a multi-dimensional view of the plurality of connected devices, the plurality of network connections and the one or more configuration issues;
   wherein the multi-dimensional view displays a first connection comprising a first line in a first direction and a second connection comprising a second line in a second direction opposite the first direction between a first port of a first device of the at least two connected devices and a second port of a second device of the at least two connected devices;
   wherein the multi-dimensional view displays the first connection between the first and second ports with a corresponding first textual indication of first transmission settings of the first port adjacent the first line and displays the second connection between the first and second ports with a corresponding second textual indication of second transmission settings of the second port adjacent the second line, wherein the first and second transmission settings are different from each other;

wherein the multi-dimensional view displays at least one of the plurality of network connections as a third line between respective ports of the at least two connected devices with a corresponding third textual indication identifying one of the management network and the workload network adjacent the third line; and wherein the steps of the method are executed by a processing device operatively coupled to a memory.

2. The method of claim 1, wherein the visualization comprises a three-dimensional view of the system.

3. The method of claim 1, further comprising identifying parameters of the plurality of network connections, wherein the parameters comprise one or more of a data center bridging setting, a baud rate setting, and a negotiation setting.

4. The method of claim 1, further comprising identifying one or more interface points for each of the plurality of connected devices, wherein the visualization further comprises a depiction of connections between given interface points of the two or more of the plurality of connected devices.

5. The method of claim 1, wherein collecting the device data and the connection data further comprises mapping one or more virtual media access control addresses to one or more physical media access control addresses.

6. The method of claim 1, wherein collecting the device data and the connection data further comprises:
   collecting the plurality of media access control addresses corresponding to the plurality of connected devices; and
   collecting a plurality of parameters from the plurality of connected devices.

7. The method according to claim 6, wherein generating the visualization comprises associating the plurality of parameters with corresponding ones of the plurality of network connections.

8. The method according to claim 6, further comprising:
   creating a directed graph comprising the plurality of media access control addresses as a plurality of nodes; and
   grouping nodes of the plurality of nodes that correspond to a same teamed network interface controller as a team node.

9. The method according to claim 8, further comprising grouping nodes of the plurality of nodes and one or more team nodes that correspond to a same device as a device node.

10. The method according to claim 9, further comprising grouping one or more device nodes that correspond to the same logical entity as a logical entity node.

11. The method according to claim 9, further comprising tagging location data with the device node.

12. The method of claim 1, wherein the visualization depicts a network connection without a configuration issue differently from a network connection with a configuration issue.

13. The method according to claim 1, wherein at least one of the at least two connected devices comprises a switching device.

14. An apparatus comprising:
   a processing device operatively coupled to a memory and configured to:
      collect device data and connection data corresponding to a plurality of connected devices in a system;

wherein, in collecting the device data and the connection data, the processing device is configured to:
   retrieve data identifying a plurality of network ports corresponding to the plurality of connected devices;
   map the plurality of network ports to one or more network layer addresses, the one or more network layer addresses comprising one or more communications protocol addresses; and
   map the one or more network layer addresses to a plurality of media access control addresses corresponding to the plurality of connected devices;
identify a plurality of network connections between two or more of the plurality of connected devices from the device data and the connection data;
detect one or more configuration issues across one or more of the plurality of network connections;
classify one or more of the plurality of network connections as one of a management network and a workload network, wherein the management network comprises an infrastructure designed for management tasks, and the workload network comprises an infrastructure designed for workload tasks; and
generate a visualization of a topology of the plurality of connected devices in the system;
wherein the one or more configuration issues comprise different transmission settings of at least two connected devices of the plurality of connected devices, the different transmission settings comprising at least one of different trust settings, different negotiation settings and different protocol settings of the at least two connected devices;
wherein the visualization comprises a multi-dimensional view of the plurality of connected devices, the plurality of network connections and the one or more configuration issues;
wherein the multi-dimensional view displays a first connection comprising a first line in a first direction and a second connection comprising a second line in a second direction opposite the first direction between a first port of a first device of the at least two connected devices and a second port of a second device of the at least two connected devices;
wherein the multi-dimensional view displays the first connection between the first and second ports with a corresponding first textual indication of first transmission settings of the first port adjacent the first line and displays the second connection between the first and second ports with a corresponding second textual indication of second transmission settings of the second port adjacent the second line, wherein the first and second transmission settings are different from each other; and
wherein the multi-dimensional view displays at least one of the plurality of network connections as a third line between respective ports of the at least two connected devices with a corresponding third textual indication identifying one of the management network and the workload network adjacent the third line.

15. The apparatus of claim 14, wherein the visualization comprises a three-dimensional view of the system.

16. An article of manufacture comprising a non-transitory processor-readable storage medium having stored therein program code of one or more software programs, wherein the program code when executed by at least one processing device causes said at least one processing device to perform the steps of:

collecting device data and connection data corresponding to a plurality of connected devices in a system;
wherein, in collecting the device data and the connection data, the program code causes said at least one processing device to perform the steps of:
retrieving data identifying a plurality of network ports corresponding to the plurality of connected devices;
mapping the plurality of network ports to one or more network layer addresses, the one or more network layer addresses comprising one or more communications protocol addresses; and
mapping the one or more network layer addresses to a plurality of media access control addresses corresponding to the plurality of connected devices;
identifying a plurality of network connections between two or more of the plurality of connected devices from the device data and the connection data;
detecting one or more configuration issues across one or more of the plurality of network connections;
classifying one or more of the plurality of network connections as one of a management network and a workload network, wherein the management network comprises an infrastructure designed for management tasks, and the workload network comprises an infrastructure designed for workload tasks; and
generating a visualization of a topology of the plurality of connected devices in the system;
wherein the one or more configuration issues comprise different transmission settings of at least two connected devices of the plurality of connected devices, the different transmission settings comprising at least one of different trust settings, different negotiation settings and different protocol settings of the at least two connected devices;
wherein the visualization comprises a multi-dimensional view of the plurality of connected devices, the plurality of network connections and the one or more configuration issues;
wherein the multi-dimensional view displays a first connection comprising a first line in a first direction and a second connection comprising a second line in a second direction opposite the first direction between a first port of a first device of the at least two connected devices and a second port of a second device of the at least two connected devices;
wherein the multi-dimensional view displays the first connection between the first and second ports with a corresponding first textual indication of first transmission settings of the first port adjacent the first line and displays the second connection between the first and second ports with a corresponding second textual indication of second transmission settings of the second port adjacent the second line, wherein the first and second transmission settings are different from each other; and
wherein the multi-dimensional view displays at least one of the plurality of network connections as a third line between respective ports of the at least two connected devices with a corresponding third textual indication identifying one of the management network and the workload network adjacent the third line.

17. The article of manufacture comprising a non-transitory processor-readable storage medium of claim 16, wherein the visualization comprises a three-dimensional view of the system.

18. The article of manufacture comprising a non-transitory processor-readable storage medium of claim 16, wherein, in collecting the device data and the connection data, the program code further causes said at least one processing device to perform the steps of:
collecting the plurality of media access control addresses corresponding to the plurality of connected devices; and
collecting a plurality of parameters from the plurality of connected devices.

19. The article of manufacture comprising a non-transitory processor-readable storage medium of claim 18, wherein, in generating the visualization, the program code causes said at least one processing device to perform the step of associating the plurality of parameters with corresponding ones of the plurality of network connections.

20. The article of manufacture comprising a non-transitory processor-readable storage medium of claim 18, wherein the program code further causes said at least one processing device to perform the steps of:
creating a directed graph comprising the plurality of media access control addresses as a plurality of nodes; and
grouping nodes of the plurality of nodes that correspond to a same teamed network interface controller as a team node.

* * * * *